United States Patent Office 3,004,089
Patented Oct. 10, 1961

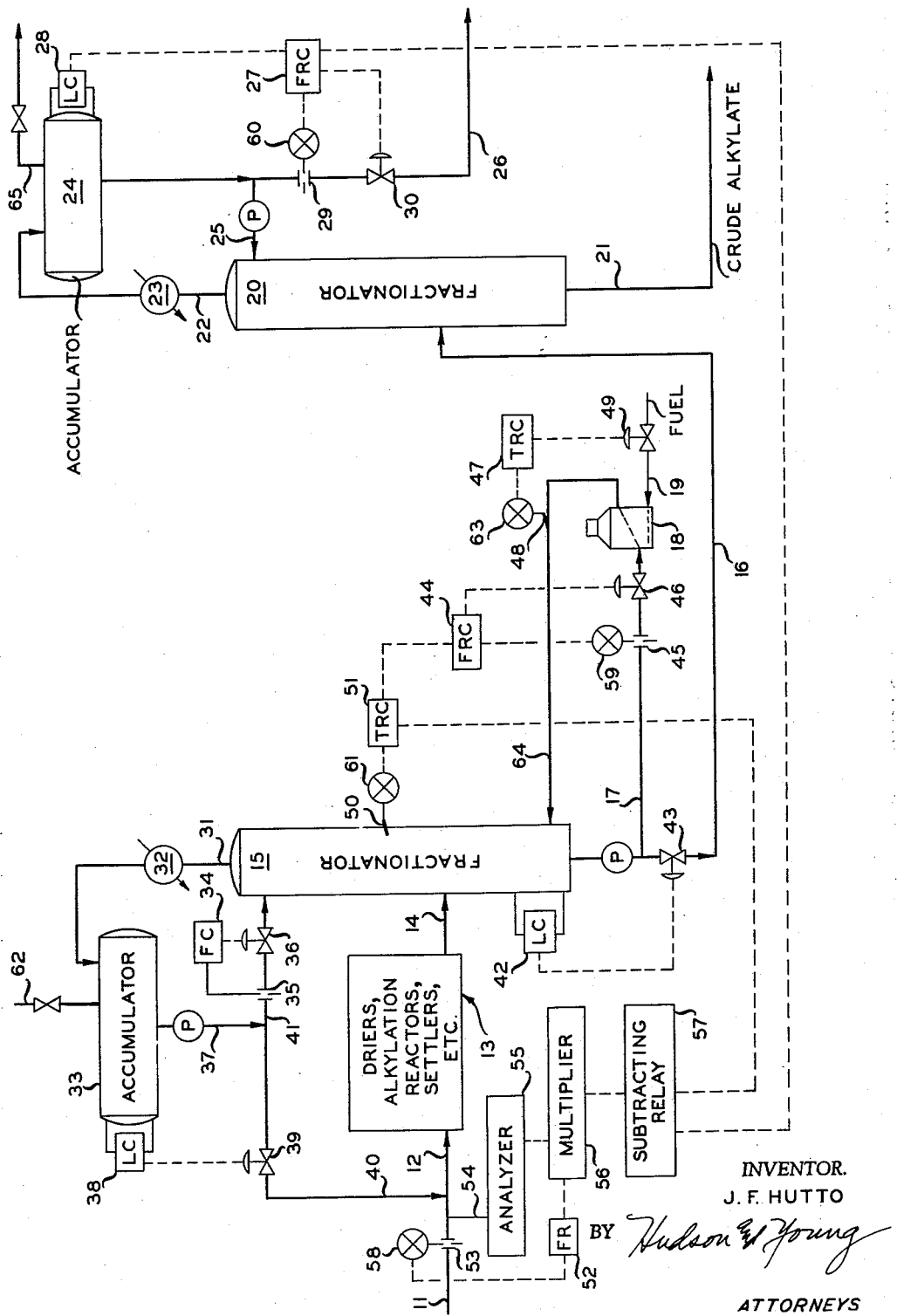

3,004,089
N-BUTANE REJECTION IN HF ALKYLATION
John F. Hutto, Bartlesville, Okla., assignor to Phillips
Petroleum Company, a corporation of Delaware
Filed Oct. 19, 1959, Ser. No. 847,402
10 Claims. (Cl. 260—683.48)

This invention relates to a control system for the separation of fluid streams by fractionation. In one aspect it relates to the elimination of the tendency for build-up in the concentration of one component in a conversion system in which a fraction of conversion effluent containing the one component is recycled to the conversion system. In another aspect it relates to a system in which a component is withdrawn from the system approximately as fast as it is added to the system as a component of the feed stock, and automatic apparatus therefor. In yet another aspect it relates to a method for carrying out such an operation.

In the production of high octane number automotive fuel blending stocks conversion processes are employed. In such processes many times, the conversion reaction is far from complete per pass of feed stock, consequently, reactant materials are present in the crude conversion product. The reactant material or materials along with other materials are recovered from the crude conversion product in operations designed to separate the conversion product in concentrated form. Materials inert to the conversion operation are frequently present and such materials merely serve as diluents with no good purpose.

For example, in the alkylation of i-butane with a butylene for the production of a high octane number alkylate, n-butane is present in the i-butane feed stock to a greater or less extent. Since n-butane is substantially inert to the ordinary alkylation catalysts its concentration increases in the conversion effluent when effluent lower boiling than the alkllate is recycled to the operation to utilize all possible i-butane. This pyramiding of n-butane dilutes the concentrations of the active reactants to such an extent that ultimately little conversion to alkylate occurs per pass of feed. It is thus necessary to remove or bleed off n-butane from the process. Prior art processes for the alkylation of i-butane do remove n-butane from the system. The ideal rate of withdrawal of n-butane is the same as its rate of addition in the feed stock. Little n-butane is formed in the system.

Furthermore, since it is difficult to make a clean separation of n-butane from i-butane by fractional distillation a reject stream of n-butane usually contains an appreciable concentration of i-butane. This latter component is one desired not to be lost. Thus, it is important to eliminate only sufficient n-butane to prevent its build-up in the system so that unnecessarily large amounts of i-butane will not be lost.

An object of this invention is to provide a method and apparatus for automatically balancing n-butane output with its input in an isobutane alkylation system.

Another object of this invention is to provide an automatic control system for balancing n-butane input and output over short periods of operating time.

Yet another object is to provide such an automatic control system repuiring the smallest amount of expensive automatic equipment.

Yet other objects and advantages will be apparent from reading the following description which, taken with the attached drawing, forms a part of this disclosure.

In the drawing the figure illustrates, in diagrammatic form, one assembly of apparatus parts for carrying out the process of the invention.

Reference numeral 13 identifies an assembly of towers, tanks, mixers, settlers, etc., with connecting piping, valves, and the like, such as is required in the alkylation of an iso-paraffin hydrocarbon with an olefin hydrocarbon. Such equipment is well known in the alkylation art and detailed description thereof is deemed unnecessary, particularly since the present invention is not particularly directed to the actual alkylation reaction.

Pipe 12 leads a mixture of feed stock containing i-butane, butylene, n-butane and some other hydrocarbons in unimportant amounts from pipe 11, and a recycle material from pipe 40 containing i-butane and n-butane to the alkylation apparatus 13. Reaction effluent from apparatus 13 is passed via a pipe 14 into a de-i-butanizer fractionation tower 15. This tower is equipped with suitable vapor-liquid contacting apparatus, such as bubble cap trays. Overhead vaporous material comprising i-butane and n-butane is withdrawn from fractionator 15 via pipe 31, is condensed in 32 and the condensed and uncondensed materials pass into an accumulator 33 for separation of phases. Condensate is pumped through a pipe 37, a portion required for refluxing fractionator 15 is passed thereinto by way of a pipe 41 and controlled by a flow controller 34 in combination with an orifice plate assembly 35 and a motor valve 36, in pipe 41. The remainder of the condensate passes through a pipe 40 into pipe 12 as a portion of the feed to the apparatus 13. A float 38 in operative communication with accumulator 33 in conjunction with a motor valve 39 regulates the rate of flow of condensate through pipe 40. A valved pipe 62 is for relief of pressure from the accumulator 33 if and when necessary.

Bottoms material comprising alkylate and containing a portion of the n-butane is passed from fractionator 15 through a pipe 16 to a de-n-butanizer 20, which is also provided with suitable vapor-liquid contact promoting apparatus. A float 42 and motor valve 43 control the removal of bottoms from fractionator 15. A portion of the bottoms is withdrawn from pipe 16 and passed through a pipe 17 to fired heater 18, and thence through a return pipe 64 to the kettle section of the fractionator for supply of reboiling heat thereto. A thermocouple 48, or other suitable temperature sensing means is disposed operatively in pipe 64. A transducer 63 changes impulses from the thermocouple 48 to an electric current, the voltage of which is proportional to temperature sensed by the thermocouple. The transducer communicates this voltage to a temperature recorder-controller 47, which in turn regulates operation of a throttle valve 49 in a fuel pipe 19. This transducer and temperature-recorder-controller will be further described hereinbelow. A motor valve 46, of a throttle type, regulates the rate of flow of bottoms material to the fired heater, and an orifice plate assembly 45 senses this rate of flow. Transducer 59 is a differential pressure cell, commonly termed a d/p cell, which changes a differential pressure from the orifice plate assembly 45 to a signal proportional to the rate of flow through 45. Flow recorder-controller 44 with a set point, records the signal from 59 in terms of rate of flow and controls the motor valve 46 in response to the signal from the d/p cell 59 to maintain the set point conditions of rate of flow.

From pipe 16, the bottoms not recirculated to heater 18 are introduced into a de-n-butanizing fractionator 20, which is also provided with suitable vapor-liquid contact promoting apparatus, such as bubble cap trays. Pipe 22 conducts overhead vapors to a condenser 23 from which condensate and uncondensed gas pass to an accumulator 24, which is provided with a valved pipe 65 for pressure relief if and whenever necessary. From this accumulator a portion of the condensate is returned to the fractionator 20 through a pipe 25 as reflux while the remainder passes from the system via pipe 26 as the n-butane withdrawn to balance the n-butane entering the system with the feed thereto in pipe 11. Pipe 21 is for removal of bottoms from fractionator 20, these bottoms being the crude alkylate product of the process. An orifice plate assembly 29 and a throttle motor valve 30 are provided in pipe 26 as shown. A transducer 60, i.e., a differential pressure transmitter is provided as shown and it transmits a fluid pressure to a flow recorder-controller 27 which is proportional to the liquid flow rate through assembly 29. This recorder records this liquid flow rate and operates a throttle motor valve 30 in response to the position of a float 28 operatively attached to the accumulator 24.

In general, the apparatus and the operation thereof involved in the discharge through pipe 26 of n-butane, per unit of time, approximately equal to the rate of inlet of n-butane with the feed in pipe 11 for the same unit of time, are as follows. An orifice plate assembly 53 in pipe 11 senses a pressure drop through the orifice of the plate proportional to the rate of flow. Transducer 58 is a differential pressure cell, known as a d/p cell and emits a signal to flow recorder 52, the signal being proportional to the pressure drop across the orifice plate assembly. Recorder 52 records the pressure differential in terms of rate of flow, the recorder having been previously calibrated. The recorder also passes the signal on to a multiplier 56. A pipe 54 conducts a small sample of the material passing through pipe 11 to an analyzer 55, which is adapted to analyze the material from pipe 54 for its n-butane content. The analyzer emits a signal which is proportional to the percent by volume of n-butane in the material analyzed to the multiplier. This instrument emits a signal which is proportional to the product of the percent n-butane (liquid) and the flow rate of feed liquid in pipe 11 to a subtracting relay 57. This product is the flow rate of liquid n-butane fed into the alkylation system 13. The signal transmitted by the d/p cell 60 through the controller 27 to the subtracting relay 57 is proportional to the flow of liquid through pipe 26 from the system. This liquid is predominantly n-butane, and for purposes of illustration it is considered to be substantially n-butane. In the subtracting relay 57, the signal from multiplier 56 (flow rate of n-butane coming in with the feed) is subtracted from the signal coming from the d/p cell 60 through the flow controller 27, leaving a positive difference. This difference, in normal operation, is always positive because the liquid flow in pipe 26 is n-butane plus minor amounts of i-butane and pentanes plus. According to the example given herein, the reject flowing through pipe 26 contains about 12.3 percent by volume i-butane and pentanes plus along with 87.7 percent by volume of n-butane. In this example the volume of liquid flowing through pipe 26 is greater than the true liquid volume of n-butane by 12.3 percent and the difference between the signal from cell 60 and the signal from the multiplier is 12.3 under conditions of equal flow rates of n-butane.

The subtracting relay 57 emits a signal to controller 51 which is proportional to the difference in liquid flow rates in pipe 26 and of n-butane in pipe 11. When the difference increases, the flow rate of liquid in pipe 26 is considered too great, and more reboiling heat must be added to the kettle of fractionator 15 so that less n-butane will leave the fractionator 15 in the bottoms to be recovered by way of pipe 26.

A thermocouple 50 is employed in fractionator 15, as illustrated, to sense temperature at some preselected point. A temperature transducer 61 is employed to emit an electric current, the voltage of which is proportional to the temperature sensed by the thermocouple 50. This current goes to a reset temperature recorder-controller 51, which records the temperature sensed by the thermocouple 50, and resets the set point of the flow recorder-controller 44 to open the throttle valve 46 thereby allowing a greater flow of bottoms to be heated in the heater 18. The first flow of liquid at the increased flow rate passing thermocouple 48 is of too low a temperature, and the set point of controller 47 then operates to open valve 49 to allow a greater volume of fuel to pass through pipe 19 to the heater 18. Thus in a very short interval of time temperature of the liquid passing thermocouple 48 has returned to normal.

The orifice plate assembly 35, valve 36 and flow controller 34 operate to maintain a uniform flow of reflux to the fractionator 15.

The following example illustrates the operation of the process as disclosed herein. The data are given in terms of barrels (42 gallons) per stream day. The various process streams carry the same reference numerals as appear on the drawing.

EXAMPLE

|  | 11 Fresh Feed | 40 Recycle Iso-butane | 12 Total Feed | 14 DIB Feed | 31 DIB OVHD | 16 DIB Bttms. | 26 DEB OVHD | 21 DEB Bttms. |
|---|---|---|---|---|---|---|---|---|
| Hydrofluoric Acid |  | 60 | 60 | 60 | 60 |  |  |  |
| Propylene | 6 |  | 6 |  |  |  |  |  |
| Propane | 92 | 909 | 1,001 | 1,002 | 1,002 |  |  |  |
| Isobutane | 1,267 | 9,182 | 10,449 | 9,270 | 9,184 | 86 | 85 | 1 |
| Butylenes | 977 |  | 977 |  |  |  |  |  |
| N-butane | 721 | 2,341 | 3,062 | 3,062 | 2,341 | 721 | 676 | 45 |
| Pentanes plus | 123 | 183 | 306 | 2,083 | 183 | 1,900 | 10 | 1,890 |
| Total | 3,186 | 12,675 | 15,861 | 15,477 | 12,770 | 2,707 | 771 | 1,936 |

In the above example, it is noted that the flow rate of the n-butane rich distillate in pipe 26 is 771 barrels per stream day, of which 721 barrels represents n-butane, and this quantity of n-butane is the quantity of n-butane in the original feed stock to the operation. Since the composition of the material flowing through pipe 26 is approximately uniform, analysis thereof is not necessary for operational control purposes. When the flow rate of this material is 771 barrels per day and the feed butane is 721 barrels per day, the difference is 50 barrels per day. Then operation-wise, when the difference sensed by the subtracting relay is 50, the amount of reboiling heat is that required to remove the amount of n-butane in pipe 26 which is added to the system in the feed stock of the composition given.

The differential pressure transmitters 58, 59 and 60 operate in the manner, and as explained in relation to transmitter 58. This transmitter receives two unlike pressures from the orifice plate assembly 53 and transmits a pressure on through flow recorder 52 to the multiplier 56 proportional to the difference of the two unlike pressures. The orifice plate assembly 53 includes an orifice plate and a separate pressure tap on either side of the plate. Such apparatus is well known in the instrument art and needs not be further described. The differential pressure transmitters 58, 59 and 60 can be Foxboro d/p cells, and manufactured by the Foxboro Instrument Company, Foxboro, Massachusetts.

The temperature transducers 61 and 63 are likewise well known in the instrument art, and serve the purpose of emitting an electric current, the voltage of which is proportional to the temperature sensed by such a temperature sensing device as thermocouple 50 or thermocouple 48. Temperature transducers can be obtained from instrument supply houses, such as Foxboro.

Flow rate recorder 52, flow controller 34, and liquid level controller comprising float 38 and motor valve 39 are likewise conventional equipment available from instrument supply houses.

Temperature recorder-controllers 51 and 47 are also conventional equipment available from instrument supply houses. The controller 51 in the present case receives an air pressure impulse from the subtracting relay 57 and said air pressure impulse resets the control temperature. The reset control of controller 51 then resets the set point of the flow recorder-controller 44 to regulate the rate of flow of bottoms through pipe 17 to the heater 18, this latter then supplies more or less heat to the kettle section of fractionator so that less or more, as the case may be, n-butane leaves the fractionator with the bottoms. The temperature recorder-controller 47 merely regulates, for example, air pressure to the air motor of motor valve 49 in response to the temperature as sensed by thermocouple 48. These temperature controllers are also conventional instruments, obtainable from instrument supply houses.

Flow rate recorder-controllers 44 and 27 are also common equipment obtainable from such supply houses as mentioned above. Controller 44 regulates the setting of motor valve 46 in response to an air pressure which is proportional to the pressure differential on opposite sides of the orifice plate of assembly 45. Controller 51 sends an air pressure impulse to controller 44 thereby resetting its set point. Flow recorder-controller 27 is a dual instrument, also obtainable from supply houses, and regulates motor valve 30 in response to the position of float 28. From this aspect instrument 27 along with float 28 operates as a liquid level controller. Orifice plate assembly and transducer 60 send an impulse to the recorder-controller which records the rate of flow of liquid through the orifice plate assembly and in turn sends an air pressure impulse to the subtracting relay proportional to the rate of fluid flow through 29.

Thermocouples 48 and 50, also, are commonly used equipment easily available. Analyzer 55 preferably is a chromatographic analyzer and is fully described in a co-pending application Serial No. 746,768, filed July 7, 1958. However, if desired, to obtain a pneumatic impulse from the analyzer of Serial No. 746,768, it is merely necessary to insert an electrical-to-pneumatic transducer in the output from the analyzer. The analyzer 55 is calibrated to transmit air pressure which is proportional to the liquid n-butane content of the feed stock passing through pipe 11. As mentioned hereinabove the flow recorder records flow rate of the total feed passing through pipe 11 and further transmits a pneumatic impulse which is proportional to this flow rate, for example, in terms of barrels per day, to multiplier 56. The signal from the flow recorder 52 which is proportional to the liquid flow rate of feed in pipe 11 and the signal from the analyzer 55 which is proportional to the percentage of n-butane, in liquid phase, in the feed are supplied to a multiplier 56 which produces a pneumatic output signal proportional to the rate of flow of liquid n-butane in the feed in pipe 11. Multiplier 56 can be any conventional computing device which multiplies input signals to produce an output signal which is proportional to the product of the input signals, such as a Minneapolis-Honeywell 5 Sorteberg type M force bridge multiplier described in Minneapolis-Honeywell catalog C80-1 page 4.

The output signal proportional to the rate of liquid flow of n-butane in pipe 11 from multiplier 56 is supplied to a subtracting relay 57 to be subtracted from a signal proportional to the rate of flow of liquid in pipe 26. The liquid flowing in pipe 26, while not pure n-butane, is considered as n-butane for practical purposes. The signal supplied by the subtracting relay resets the set point of the temperature controller 51 which in turn resets the set point of the flow controller 44 to regulate the temperature of the fractionator 15 to control the withdrawal of n-butane in the kettle product from this fractionator. A subtracting relay suitable for the purpose at hand is described in Foxboro Technical Information Bulletin 37–A–57a (September 12, 1956).

The present invention, while described as applied to an i-butane alkylation operation, is obviously not limited thereto. It can be applied to other operations wherein one process stream is analyzed for a component, the flow rate of this one process stream being determined, the product of the flow rate and composition with respect to the component in question yielding the input of the component to the system. The component, being mainly a diluent in the operation, is withdrawn at least from cyclic streams to prevent its build-up or pyramiding in the operation. The flow rate of the component withdrawn is determined, and as long as the quantity of component withdrawn is at least equal to that added with the feed, with none being formed or consumed in the process, build-up is controlled. The invention is applicable to a process in which i-pentane is reacted with an olefin to form an alkylate, and the feed stock of i-pentane containing n-pentane. N-pentane is withdrawn from the system so that upon recycling unreacted i-pentane which normally is accompanied by n-pentane, the latter will not build up in concentration to retard the alkylation reaction.

While certain embodiments of the invention have been described for illustrative purposes, the invention obviously is not limited thereto.

I claim:

1. Apparatus for eliminating an inert component in a cyclic conversion system as rapidly as it is added to the system in the charge stock thereto, comprising, in combination, a conversion assembly, a first feed inlet and an effluent outlet in said assembly, first and second fractionating columns having second and third separate feed inlets, separate overhead product outlets and separate bottoms product outlets, the effluent outlet of said assembly being in operative communication with said first feed inlet, the bottoms product outlet of the first fractionating column being in operative communication with said third inlet, a first flow rate sensing means communicating with said first feed inlet, an analyzer in operative communication with said first feed inlet, a first conduit operatively connecting the overhead outlet of said first fractionating column with said first feed inlet intermediate said assembly and said first flow sensing means and analyzer, second means for adding reboiling heat to the kettle section of said first fractionating column, a third flow rate sensing means operatively in the overhead product outlet of said second fractionating column and communicating with a relay subsequently mentioned, said analyzer being adapted to emit a signal proportional to the concentration of said inert component in said first feed inlet, a multiplier in operative communication with said analyzer and with said first flow sensing means, the signal emitted by said multiplier being proportional to the product of the charge stock flow rate and the fraction of said inert material in said charge stock and thus to the flow rate of said inert material in said first feed inlet, said relay subsequently mentioned being a subtracting relay in operative communication with the outlet of said multiplier and with said third flow sensing means, said relay being adapted to emit a signal proportional to the difference of the flow rate sensed by said third flow sensing means and the flow rate of said inert component in said first feed inlet as sensed by said multiplier, said second means including a second conduit for adding reboiling heat to the kettle of said first fractionating column, a flow control means operatively in said second conduit and communicating with the outlet of said relay, and said flow control means being adapted to regulate the inlet of heat to the kettle section of said first fractionation column in response to a signal emitted by said subtracting relay.

2. Apparatus for controlling build-up of a first component in a conversion system wherein said first component accompanies a second and a third component in a charge stock to said system, said first component being unconverted and at least a portion of the second and third components being converted in said system, comprising, in combination, a conversion assembly having a charge stock inlet and a conversion effluent outlet, first and second fractionating columns, each column having a fluid inlet, an overhead product outlet and a bottoms product outlet, a first conduit communicating the overhead outlet of the first fractionator with said charge stock inlet, a first flow rate sensing assembly operatively communicating with said charge stock inlet on the side of the point of juncture of said first conduit with said charge stock inlet opposite said conversion system, an analyzer communicating with said charge stock inlet on the side of the point of juncture of said first conduit with said charge stock inlet opposite said conversion assembly, said analyzer being of such nature as to analyze said charge stock for the content of said first component, conduit means operatively communicating with the kettle section of said first fractionating column for supplying reboiling heat, the bottoms product outlet of said first column also communicating with the fluid inlet of said second column, a second flow rate sensing assembly communicating operably with said means for supplying reboiling heat, a third flow rate sensing means in operative communication with the overhead outlet of said second column, a multiplier communicating with said first flow rate sensing assembly and with said analyzer and being adapted to multiply a signal of said analyzer by a signal from the first flow rate sensing assembly, a subtracting relay communicating with said third flow rate sensing assembly and with said multiplier to produce a signal proportional to the product of signals from said third flow rate sensing assembly and from said multiplier, a temperature controller communicating with said first column, a second flow controller communicating with said conduit means, whereby said signal from said relay resets the set point of said temperature controller and said temperature controller thereby resets a set point of said second flow controller thereby resetting this latter set point and regulating the rate of flow of liquid through said conduit means, and a heat exchanger in heat exchanging relation with said conduit means.

3. A method for reducing the build-up of n-butane in a cyclic isobutane-butylene catalytic alkylation operation comprising passing a charge stock comprising n-butane, i-butane and butylene into an alkylating zone maintained under i-butane-butylene alkylating conditions, withdrawing effluent from said zone and distilling same thereby producing an overhead stream comprising i-butane and n-butane, returning this overhead stream to the charge stock downstream from a point in the flow of charge stock from which a sample is taken and analyzed as subsequently stated, and a bottoms material comprising alkylate-containing n-butane, adding reboiling heat to the distilling operation, withdrawing this bottoms material from said distilling operation and distilling same under de-n-butanizing conditions thereby producing a n-butane-rich overhead stream and a crude alkylate, withdrawing n-butane-rich overhead material from this operation as product, determining the liquid rate of flow of the n-butane-rich overhead material withdrawn, determining the liquid rate of flow of said charge stock, analyzing said charge stock n-butane content, feeding an impulse corresponding to said liquid flow rate of said charge stock and an impulse corresponding to the n-butane liquid content of said charge stock into a multiplier, passing an impulse corresponding to the product of said n-butane content of said charge stock and the flow rate of said charge stock and an impulse corresponding to the flow rate of said n-butane-rich overhead material into a subtracting relay, said relay emitting a signal proportional to the difference of the signal of said n-butane material flow rate and of said product, resetting a set point of a flow controller thereby regulating the addition of reboiling heat to the first mentioned distilling operation.

4. In a fluid mixture conversion system wherein a fluid mixture is to be converted and the conversion effluent separated into a recycle material, a reject material and a desired product, a control system comprising, in combination, an analyzer adapted to provide a first signal representative of the composition of a sample of said fluid mixture supplied thereto, a first flow rate determining means adapted to provide a second signal representative of the flow rate of said fluid mixture, a converter, a first conduit means communicating with said converter for passage of said fluid mixture thereto, said analyzer and said first flow rate determining means communicating operably with said first conduit, a first fractionator having an overhead outlet and a bottoms withdrawal outlet, a second conduit communicating said converter with said first fractionator, conduit means communicating said overhead outlet with said first conduit, a second fractionator having an overhead outlet and a bottoms outlet, a third conduit communicating the bottoms outlet of said first fractionator with said second fractionator, a second flow rate determining means communicating with said overhead outlet of said second fractionator and adapted to provide a signal representative of the flow rate of fluid in this latter overhead outlet, means for adding reboiling heat to the kettle section of the first fractionator, a multiplier connected operably with the first flow rate determining means and with said analyzer, said multiplier being adapted to receive signals from said first flow rate determining means and from said analyzer and to emit a signal representative of the product thereof, a subtracting relay connected operably with said multiplier and with said second flow rate determining means and being adapted to receive a signal from said multipler and from said second flow rate determining means and to emit a signal representative of the difference thereof, a fourth conduit for passage of hot reboiler fluid to the kettle section of the first fractionator, flow control means operatively in said fourth conduit, a fifth conduit communicating said subtracting relay with said flow control means whereby said flow control means is regulated in response to the signal emitted from said relay thereby regulating flow of hot reboiler fluid.

5. In the conversion system of claim 4, said fourth conduit communicating operably with said third conduit, and a heater positioned in operable rotation with said fourth conduit.

6. In the system of claim 5, wherein said heater is a fired heater, a sixth conduit communicating a source of fuel with said heater, a valve in said sixth conduit, a temperature sensing means in said fourth conduit on the outlet side of said heater, a temperature recorder-controller in operative communication with said temperature sensing means and with said valve.

7. In the system of claim 5, a temperature sensing device in operative communication with the interior of said first fractionator, a reset temperature recorder-controller in said fifth conduit and communicating with said temperature sensing device, a third flow rate sensing means in said fourth conduit, a flow rate recorder-controller in said fifth conduit intermediate said reset temperature recorder-controller and said fourth conduit, a motor valve in said fourth conduit, separate conduits linking said third flow rate sensing means and said motor valve with said flow rate recorder-controller whereby said temperature recorder-controller resets the set point of said flow rate recorder-controller in response to the signal emitted from said subtracting relay.

8. A method for reducing the build-up of a material in a cyclic alkylation operation, said material being inert to the alkylation operation, comprising passing a charge stock comprising an isoparaffin hydrocarbon and an olefin hydrocarbon and said inert material into an alkylation zone operated under alkylation conditions, withdrawing effluent from said zone and distilling same whereby an overhead fraction containing a portion of said inert material is produced, cycling this overhead material to the alkylation zone, and a bottoms material containing the remainder of said inert material, adding reboiling heat to the distillation operation, distilling said bottoms material in a second distilling operation, removing an overhead distillate from this latter operation comprising said inert material and a bottoms product, determining the rate of flow of this latter distillate, determining the rate of flow of the original charge stock to said alkylation zone, analyzing the charge stock for content of said inert material, feeding an impulse corresponding to the rate of flow of charge stock and an impulse corresponding to the content of inert material in said feed stock into a multiplier and therein multiplying the impulses, determining the difference of the impulse corresponding to the product of impulses from an impulse corresponding to the rate of flow of said latter distillate and regulating the addition of said reboiling heat in response to said difference of impulses.

9. In the method of claim 8, regulating the addition of said reboiling heat so that the rate of flow of said latter distillate is substantially equal to the rate of flow of said inert material in the feed stock.

10. In the method of claim 3, regulating the addition of said reboiling heat so that the rate of flow of said n-butane-rich overhead material corresponds to the rate of flow of n-butane in said feed stock.

References Cited in the file of this patent

UNITED STATES PATENTS

| | | |
|---|---|---|
| 2,346,770 | Lobdell et al. | Apr. 18, 1944 |
| 2,378,216 | Haensel et al. | June 12, 1945 |
| 2,431,500 | Penick | Nov. 25, 1947 |
| 2,664,452 | Putney | Dec. 29, 1953 |
| 2,881,235 | Van Pool | Apr. 7, 1959 |